(12) United States Patent
Brosowsky et al.

(10) Patent No.: US 10,616,412 B1
(45) Date of Patent: Apr. 7, 2020

(54) PROCESSING AN EMERGENCY SERVICES CALL

(71) Applicant: Geo-Comm, Inc., St. Cloud, MN (US)

(72) Inventors: John Brosowsky, St. Cloud, MN (US); Erik Loberg, St. Cloud, MN (US); Donald Le Roy Mitchell, Bellevue, WA (US)

(73) Assignee: Geo-Comm, Inc., St. Cloud, MN (US)

( * ) Notice: Subject to any disclaimer, the term of this patent is extended or adjusted under 35 U.S.C. 154(b) by 0 days.

(21) Appl. No.: 16/107,327

(22) Filed: Aug. 21, 2018

Related U.S. Application Data

(60) Provisional application No. 62/608,558, filed on Dec. 20, 2017.

(51) Int. Cl.
*H04M 7/00* (2006.01)
*H04W 88/02* (2009.01)
*H04L 29/08* (2006.01)
*H04M 3/51* (2006.01)
(Continued)

(52) U.S. Cl.
CPC .......... *H04M 3/5116* (2013.01); *H04W 4/02* (2013.01); *H04W 4/18* (2013.01)

(58) Field of Classification Search
CPC ....... H04W 4/90; H04W 76/50; H04W 4/029; H04W 64/00; H04W 4/025; H04W 4/18; H04W 64/003; H04W 4/02; H04W 4/024; H04W 4/023; H04W 88/16; H04M 3/5116; H04M 2242/04; H04M 11/04; H04M 2242/30; H04M 1/72536; H04M 3/42348; H04M 2242/14; H04M 1/72572;
(Continued)

(56) References Cited

U.S. PATENT DOCUMENTS

| 6,934,634 | B1 | 8/2005 | Ge |
| 7,668,651 | B2 | 2/2010 | Searight |
| 8,244,802 | B2 | 8/2012 | Mitchell |

(Continued)

FOREIGN PATENT DOCUMENTS

WO  2016117738 A1  7/2016

OTHER PUBLICATIONS

Lee, Jiyeong, GIS-based geocoding methods for area-based addresses and 3D addresses in urban areas; Environment and Planning B: Planning and Design 2009, vol. 36, pp. 86-106.
(Continued)

*Primary Examiner* — Gary Lafontant
(74) *Attorney, Agent, or Firm* — Moss & Barnett; Michael A. Bondi

(57) ABSTRACT

A code generator can receive a data object from a legacy network gateway location interwork function (LNG-LIF) for an emergency services call initiated by an end-user device, wherein the data object includes location information in a legacy format. The code generator can select fields of the location information for the emergency services call. The code generator can convert data object in the legacy format into a presence information data format location object (PIDF-LO) based on the selected fields of the location information in the data object for the emergency services call. The PIDF-LO embeds location information for the end-user device. Additionally, the code generator can send the PIDF-LO to the LNG-LIF, wherein the PIDF-LO is a format consumable by an Emergency Call Routing Function (ECRF).

20 Claims, 6 Drawing Sheets

(51) Int. Cl.
*H04W 4/18* (2009.01)
*H04W 4/02* (2018.01)

(58) Field of Classification Search
CPC ..... H04M 15/8033; H04M 2215/7435; H04M 2242/15; H04L 67/18
See application file for complete search history.

(56) References Cited

U.S. PATENT DOCUMENTS

| | | | |
|---|---|---|---|
| 8,290,510 | B2 | 10/2012 | Thomson |
| 8,731,585 | B2 | 5/2014 | Zarem |
| 8,972,167 | B1 | 3/2015 | Taykar |
| 8,996,545 | B2 | 3/2015 | Chen |
| 9,020,941 | B1 | 4/2015 | Gupta |
| 9,087,132 | B2 | 7/2015 | Mitchell |
| 9,148,491 | B2 | 9/2015 | Mitchell, Jr. |
| 2007/0162228 | A1 | 7/2007 | Mitchell |
| 2010/0034179 | A1 | 2/2010 | Semper |
| 2010/0317317 | A1* | 12/2010 | Maier .................. H04W 64/00 455/404.2 |
| 2014/0320485 | A1 | 10/2014 | Neophytou |
| 2018/0352094 | A1* | 12/2018 | Ginter ................ H04M 7/0087 |

OTHER PUBLICATIONS

Emergent Communication; "Emergent Communications 9-1-1 Software Solutions for Call Routing and Delivery"; Technical White Paper, May 2017, 9 pgs.
National Emergency Number Association (NENA) Technical Committee Chairs; "NENA Standard for the Implementation of the Wireless Emergency Service Protocol E2 Interface"; NENA-05-001, Dec. 2, 2003, 47 pgs.

* cited by examiner

120

| Name | Tag | Max Chars | Type | Description |
|---|---|---|---|---|
| Cell ID | <CEL></CEL> | 6 | ANV | Identification number indicating a geographic region of wireless coverage. (i.e. the cell site where the call is received. Valid Values: 0-2047) |
| Company ID 1 | <CPF></CPF> | 5 | ANV | NENA registered Company Identification code for Service Provider providing wireline or wireless service to the customer. |
| County ID | <COI></COI> | 5 | ANV | County Identification Code |
| Customer Name | <NAM></NAM> | 32 | ANV | Subscriber Name |
| Emergency Medical Service Responder | <EMS></EMS> | 25 | ANV | Name of Emergency Medical Service Responder associated with the ESN of the caller. |
| Emergency Services Number | <ESN></ESN> | 5 | ANV | Emergency Service Number associated with the House Number and Street Name and Community Name. *Note: The Service Provider, providing the E9-1-1 Selective Routing will assign ESN's.* |
| Fire Department Service Responder | <FIR></FIR> | 25 | ANV | Name of Fire Department Service Responder associated with the ESN of the caller. |
| House Number | <HNO></HNO> | 10 | ANV | House Number |
| House Number Suffix | <HNS></HNS> | 4 | ANV | House Number Extension (e.g. ½) |
| Law Enforcement Service Responder | <LAW></LAW> | 25 | ANV | Name of Law Enforcement Service Responder associated with the ESN of the caller. |
| Location | <LOC></LOC> | 60 | ANV | Additional location information (free formatted) describing the exact location of the Calling Party Number. (e.g., "Apt 718" or "cell sector A") Emergency Response Location (ERL) - A Location to which a 9-1-1 emergency response team may be dispatched. The location should be specific enough to provide a reasonable opportunity for the emergency response team to quickly locate a caller anywhere within it. This information may be displayed at the PSAP |
| MSAG Community | <MCN></MCN> | 32 | AV | Valid service community name as identified by the MSAG |
| Post Directional | <POD></POD> | 2 | AV | Directional Trailing street direction suffix. Valid Entries: N S E W NE NW SE SW |
| Prefix Directional | <PRD></PRD> | 2 | AV | Directional Leading street direction prefix. Valid Entries: N S E W NE NW SE SW |
| Sector ID | <SEC></SEC> | 2 | AN | Sub set/section of a cell. Valid Values: 1- 15 |
| State | <STA></STA> | 2 | A | Alpha U.S. state or Canadian province abbreviation, i.e. TX (Texas), ON (Ontario) |
| Street Name | <STN></STN> | 60 | ANV | Valid service address of the Calling Party Number |
| Street Name Suffix | <STS></STS> | 4 | AV | Valid street abbreviation, as defined by the U S Postal Service Publication 28. (e.g. AVE) |

<CPF>TMOB</CPF<NAM>T-MOBILE USA</NAM><ESN>00210</ESN><CEL>1135</CEL><SEC>6</SEC>

FIG. 4

PROCESSING AN EMERGENCY SERVICES CALL

REFERENCE TO RELATED APPLICATION

This application claims the benefit of priority to U.S. Provisional Application No. 62/608,558, filed on 20 Dec. 2017, the entirety of which is herein incorporated by reference.

TECHNICAL FIELD

This disclosure relates to location information, and more particularly, to converting location information for an emergency services call.

BACKGROUND

"9-1-1" (or "911") is an emergency telephone number for the North American Numbering Plan (NANP), one of eight N11 codes. In North American jurisdictions, special privacy legislation permits emergency operators to obtain a 9-1-1 caller's telephone number and location information. For wireline telephones, this information is gathered by mapping the calling phone number to an address in a database. This database function is known as location data source. The database is generally maintained by the local telephone company, under a contract with a Public Service Answering Point (PSAP). Each telephone company has standards for the formatting of the database.

A Public Safety Answering Point (PSAP), is a call center responsible for answering calls to an emergency telephone number for police, firefighting and ambulance services. Trained telephone operators may also be responsible for dispatching these emergency services. Most PSAPs are capable of caller location for landline calls, and many can handle mobile phone locations as well (sometimes referred to as phase II location), where the mobile phone company has a handset location system. As used herein, the term PSAP can alternatively refer to an Emergency Call Center (ECC) a term employed for VoIP based emergency call systems (Voice over Internet Protocol based emergency call systems).

Next Generation 9-1-1 (abbreviated "NG9-1-1") refers to an initiative by the National Emergency Number Association (NENA) aimed at updating the 9-1-1 service infrastructure in the United States and Canada to improve public emergency communications services in a growingly wireless mobile society. In addition to calling 9-1-1 from a mobile phone, NG9-1-1 intends to enable the public to transmit text, images, video and data to the PSAP. The NG9-1-1 initiative also envisions additional types of emergency communications and data transfer. The NG9-1-1 infrastructure is intended to replace the current emergency network services over time.

SUMMARY

One example relates to a code generator comprising one or more computing devices. The code generator can receive a data object from a legacy network gateway location interwork function (LNG-LIF) for an emergency services call initiated by an end-user device. The data object includes location information in a legacy format. The code generator can select fields of the location information for the emergency services call. The code generator can convert the data object in the legacy format into a presence information data format location object (PIDF-LO) based on the selected fields of the location information in the data object for the emergency services call. The PIDF-LO embeds location information for the end-user device. Additionally, the code generator can send the PIDF-LO to the LNG-LIF, wherein the PIDF-LO is a format consumable by an Emergency Call Routing Function (ECRF).

Another example relates to a system that can include a legacy network gateway location interwork function (LNG-LIF). The LNG-LIF can receive an emergency services call from an emergency gateway. The emergency services call can include an E2 interface formatted object that includes a locator key for an end-user device that initiated the emergency services call and location information for the end-user device. The system can also include a code generator that receives the E2 interface formatted object from the LNG-LIF and selects fields in the E2 interface formatted object. The code generator can generates a presence information data format location object (PIDF-LO) based on the selected fields of the E2 interface formatted object. The PIDF-LO characterizes a geographic location associated with the end-user device. The code generator can provide the PIDF-LO to the LNG-LIF. Moreover, the LNG-LIF selects an Emergency Services Routing Proxy (ESRP) for the emergency services call. The LNG-LIF transfers the emergency services call includes the PIDF-LO to the selected ESRP. The selected ESRP can transfer the emergency services call to a given Public Safety Answering Point (PSAP) with jurisdiction over the geographic location characterized by the PIDF-LO.

Still another example relates to a method that includes an E2 interface formatted object from a legacy network gateway location interwork function (LNG-LIF) for an emergency services call initiated by an end-user device. The E2 interface formatted object includes location information for the end-user device. The method can also include determining a type for the end-user device. The method can further include selecting fields of the location information in the legacy format for the emergency services call based on the type of the end-user device. The method can still yet further include transforming the E2 interface formatted object into a presence information data format location object (PIDF-LO). The PIDF-LO embeds location information for the end-user device. The method also includes sending the PIDF-LO to the LNG-LIF. The PIDF-LO is a format consumable by an Emergency Call Routing Function (ECRF).

BRIEF DESCRIPTION OF THE DRAWINGS

FIG. 3 illustrates identifiers for tags of the E2 interface formatted object of FIG. 2.

FIG. 4 illustrates an example of a Presence Information Data Format Location Object (PIDF-LO) formatted in XML.

DETAILED DESCRIPTION

Systems and methods are disclosed for processing an emergency services call. Upon initiating an emergency services call (e.g., by dialing "9-1-1" in North America), a primary service delivery node (PSDN) transfers the emergency services call to an emergency gateway.

The emergency gateway can assign a locator key to the emergency services call and query a carrier location server for location information related to the end-user device. The location information returned to the gateway can be embedded in a data object formatted in the E2 interface, which can be referred to as an E2 interface formatted object. The emergency gateway can transfer the emergency call, along with the locator key and the E2 interface formatted object to a legacy network gateway location interwork function (LNG-LIF). The LNG-LIF can provide the E2 interface formatted object to a code generator.

The code generator can examine fields of the E2 interface formatted object to determine the fields needed to generate a Presence Information Data Format Location Object (PIDF-LO) for the emergency services call. The PIDF-LO includes location information (e.g., characterizing a geographic location corresponding to the end-user device). The code generator returns the PIDF-LO to the LNG-LIF. The LNG-LIF can provide the locator key and the PIDF-LO to an Emergency Call Routing Function (ECRF). The ECRF identifies a Public Safety Answering Point (PSAP) with jurisdiction over the location characterized in the PIDF-LO. Additionally, the ECRF identifies an Emergency Services Routing Proxy (ESRP) associated with the PSAP, and returns the identified ESRP to the LNG-LIF.

In response to receipt of the identified ESRP, the LNG-LIF selects the identified ESRP as the ESRP for the emergency services call. Additionally, the LNG-LIF transfers the emergency services call to the selected ESRP, along with the PIDF-LO. The selected ESRP can transfer the emergency services call with the PIDF-LO to the PSAP. In response, the PSAP can output data embedded in the PIDF-LO (e.g., location information for the end-user device) at a user terminal of the PSAP (sometimes referred to as customer premises equipment) such that an operator of the user terminal can dispatch emergency services for the emergency services call. By employing the systems and methods described herein, legacy call information, namely, the E2 interface formatted object can be leveraged to generate the PIDF-LO, which can be used by the ECRF and/or the ESRP to process emergency services calls in a manner that complies with Next Generation 9-1-1 (NG9-1-1) standards.

Figure 1:
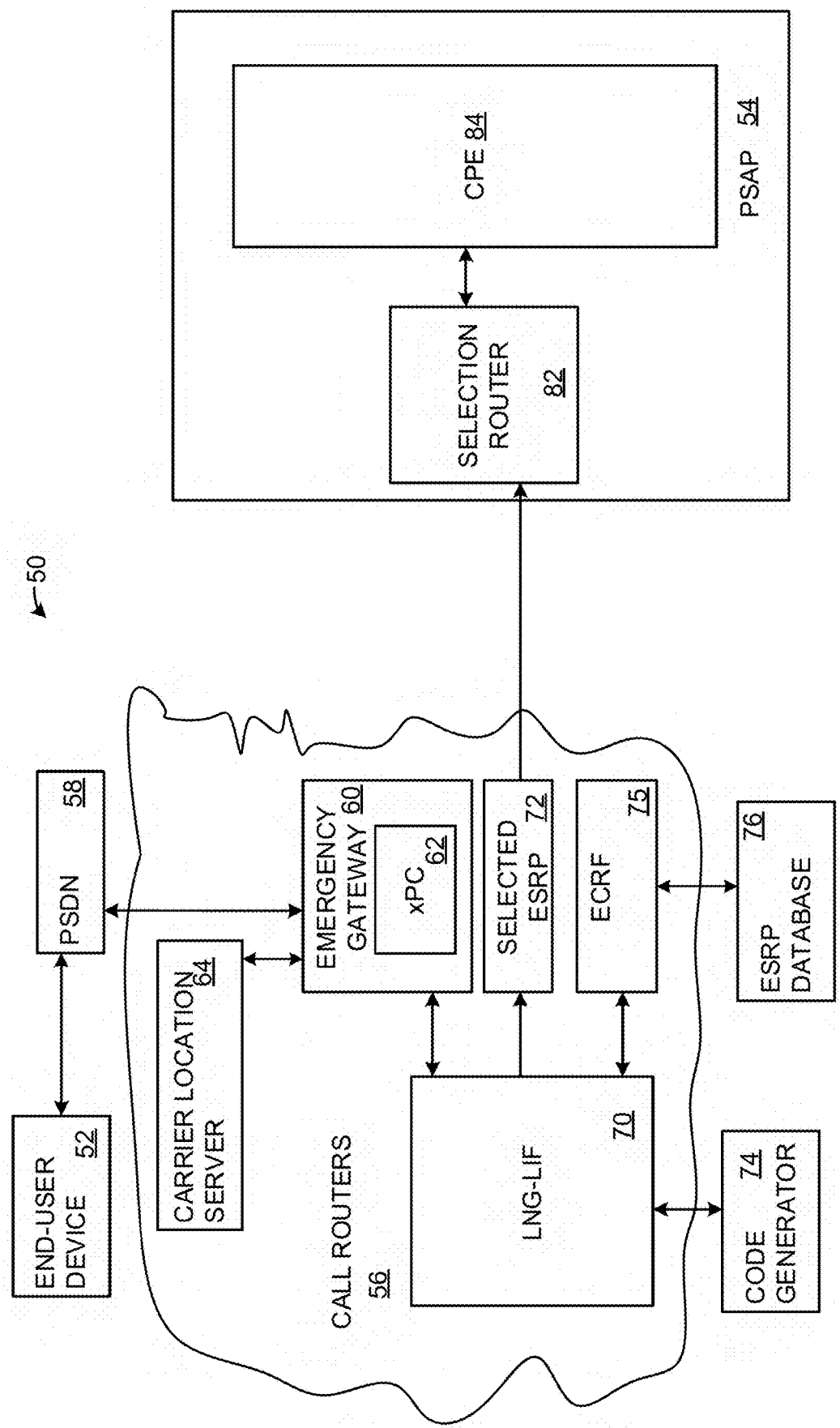
FIG. 1 illustrates an example of a system configured to process an emergency services call.

FIG. 1 illustrates an example of a system 50 configured to facilitate the processing of emergency service calls. Communication between nodes of the system 50 can be conducted via a private network (e.g., a wireless carrier network), a public network (e.g., the Internet), or a combination thereof. The system 50 can include an end-user device 52 operated by an end-user, which end-user can be referred to as a caller. The end-user device 52 can be a mobile device, such as a wireless phone operating on a carrier network (e.g., a smart phone, a feature phone, etc.), Voice over Internet Protocol (VoIP) phone, etc.

The end-user device 52 can be employed by the caller to initiate an emergency services call. The emergency services call can be, for example, a voice 9-1-1 call, a 9-1-1 text (or short) message (e.g., a short message service (SMS) message or a real-time text (RTT) message), etc. The emergency services call can be a request for immediate emergency assistance, including ambulatory service, police assistance, fire department assistance, assistance on waterways or some combination thereof. In some examples, the end-user device 52 may be issued or controlled by a particular enterprise (e.g., a business) that maintains its own call center (e.g., a secondary call center) for handling emergency service calls.

The emergency services call can be routed to a particular PSAP 54 via call routers 56 in a manner described herein. In particular, the end-user device 52 can be connected to a primary service delivery node (PSDN) 58. In examples where the end-user device 52 is a mobile phone operating on a carrier network, the PSDN 58 can be implemented as a Mobile Switching Center (MSC). In examples where the end-user device is a VoIP phone, the PSDN 58 can be implemented as a VoIP service provider (VSP). The PSDN 58 can be connected to the call routers 56. The call routers 56 can be representative of a collection of telephony routers, including, but not limited to a cell tower, selective routers, etc. The call routers 56 can be implemented as part of the Public Switched Telephone Network (PSTN), the Internet and/or as part of a private network (e.g., a wireless carrier network).

The PSDN 58 can provide a notification of the emergency services call to an emergency gateway 60 of the call routers 56. The emergency gateway 60 can be configured as a router (e.g., a hardware device). In some examples, the emergency gateway 60 can be implemented as a distributed computing device (e.g., an instance of virtual hardware) executing in a computing cloud. In other examples, the emergency gateway 60 can be implemented as a single instance of hardware. The emergency gateway 60 can include the functionality and/or structure of a positioning center, which can be referred to as an "xPC" 62. The xPC 62 of the emergency gateway 60 can be representative of nearly any non-landline positioning center, including a Mobile Positioning Center (MPC), a Gateway Mobile Positioning Center (GMLC), location retrieval function (LRF) and/or an emergency routing services (ERS) node, a VoIP Positioning Center (VPC), etc. It is also noted that in some examples, the xPC 62 and the emergency gateway 60 can be implemented on separate computing devices that communicate with each other. The call routers 56 (including the emergency gateway 60) can communicate with standard protocols, such as the HTTP (Hypertext Transfer Protocol)-Enabled Location Deliver Protocol (HELD) and/or the Mobile Location Protocol (MLP). Additionally, it is understood that in some examples, the functionality of the call routers 56 can be integrated on a single system, and in other examples, the functionality of each constituent component can be further sub-divided from that shown and described herein.

In response to the notification of the emergency services call, the emergency gateway 60 can be configured to assign a locator key to the emergency services call and determine routing information for the emergency services call. The locator key can be implemented as an Automatic Number Identifier (ANI) (e.g., a standard telephone number), a Pseudo Automatic Number Identifier (pANI), an Emergency Services Routing Key (ESRK), an Emergency Services Query Key (ESQK), any of which can alternatively be generically be referred to as an ESxK.

Additionally, to determine the routing information, the emergency gateway 60 can be configured to communicate with a carrier location server 64, such as a 9-1-1 location server. The carrier location server 64 can be configured to determine carrier location information for the end-user device 52. The carrier location server 64 is operated/controlled by a carrier network, such as a wireless network or by a infrastructure service provider (ISP). The carrier location server 64 can be implemented as a Serving Mobile Location Center (SMLC) and/or Positioning Determining Entity (PDE) location system. In some examples, the carrier location information of the end-user device 52 can be geographic coordinates (e.g., latitude and longitude coordinates) that can be determined from a query to the end-user device 52. In other examples, the carrier location information of the end-user device 52 can be derived from identification of a plurality of base stations (cell towers) communicating with the end-user device 52 via triangulation. Alternatively, the carrier location information can be a cell sector and cell identifier (Cell-ID) of a cell tower communicating with the end-user device 52. In still other examples, the carrier location information can be a civic address (street address) associated with the end-user device 52. Additionally or alternatively, the carrier location information can include data characterizing a network component (e.g., a trunk identifier (ID)) that communicates with the end-user device 52. The carrier location information can be returned to the emergency gateway 60. In some examples, the carrier location information can have an associated precision (error radius) associated with a location (e.g., +/−500 meters) and/or a timestamp. In some examples, the emergency gateway 60 can store the carrier location information in a database that is associated with the emergency services call. The xPC 62 of the emergency gateway 60 can store the location information in a database and/or lookup table that can be indexed by the locator key. That is, the locator key can be employed to identify the location information for the end-user device 52.

In response to receipt of the emergency services call, the emergency gateway 60 can be configured to query the xPC 62 with the locator key for the stored information pertaining to the emergency services call. In some examples, the xPC 62 of the emergency gateway 60 can return the stored information in an E2 interface formatted object. In other examples, the carrier location information provided from the carrier location server 64 may already be in the E2 interface format. The E2 interface formatted object can be an Extensible Markup Language (XML) formatted document (e.g., a text file) and/or a Transaction Capability Application Part (TCAP) file with fields that identify information related to the end-user device 52. That is, the E2 interface formatted object complies with the National Emergency Number Association (NENA) Standard for the Implementation of the Wireless Emergency Service Protocol E2 Interface.

The E2 interface formatted object can resolve to (i) a cell sector site (CSS) point (e.g., if the end-user device 52 is a wireless phase 1 device), (ii) latitude and longitude coordinates of a Wi-Fi hotspot in situations where the end-user device 52 is a mobile VoIP phone (iii) a civic address in situations where the end-user device 52 is a fixed-base VoIP phone (iv) a network component (e.g., a trunk identifier (ID)) of an carrier network or (v) substantially real-time latitude and longitude coordinates for the end-user device 52 based on global location navigation satellite (GNSS) signals and/or triangulation, which can also be referred to as phased 2 location. In the detailed examples described herein, it is presumed that the E2 interface formatted object resolves to either the CSS point, the latitude and longitude coordinates of a Wi-Fi hotspot for a mobile VoIP phone a civic address for a fixed-based VoIP phone or a network component (e.g., types i-iv).

Figure 2:
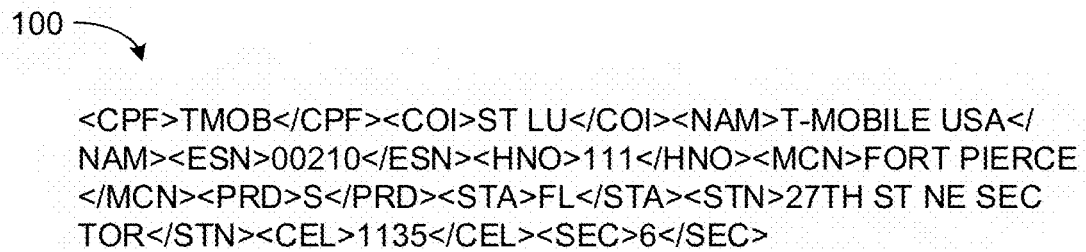
FIG. 2 illustrates an example of an E2 interface formatted object in Extensible Markup Language (XML).

FIG. 2 illustrates an example of an E2 interface formatted object 100 that could be employed for the emergency services call of FIG. 1. FIG. 3 provides a table 120 with identifiers for the tags of the E2 interface formatted object 100. The E2 interface formatted object 100 is provided in XML format for purposes of readability. However, in other examples, the E2 interface formatted object 100 could be provided in the TCAP format.

Referring back to FIG. 1, the emergency gateway 60 can examine location information in the E2 interface formatted object to determine a precision associated with the end-user device 52. In situations where the E2 interface formatted object is classified as precise location information (e.g., geographical coordinates from GNSS processing) for the end-user device 52, the emergency gateway 60 can process the emergency services call directly (not shown). In other situations, the E2 interface formatted object can be classified as being coarse (e.g., less precise) location information. For example, the E2 interface formatted object can be classified as coarse information in situations where the locator key identifies a pANI for the end-user device 52 and the carrier location information includes a CSS and cell ID (for a wireless phone), latitude and longitude coordinates for a Wi-Fi hotspot (e.g., for a mobile VoIP phone), a civic address (e.g., a fixed-base VoIP phone) or a network component (e.g., a trunk ID). For purposes of simplification of explanation, in further examples described, it is presumed that the carrier location information is classified as coarse location information.

Continuing with the example where there is coarse location information, the emergency gateway 60 transfers the emergency services call with call signaling including the locator key of the end-user device 52 and the E2 interface formatted object to a legacy network gateway location interwork function (LNG-LIF) 70 of the call routers 56. In response to receipt of the E2 interface formatted object for the emergency services call, the LNG-LIF 70 can push the E2 interface formatted object to a code generator 74.

The code generator 74 can be implemented as one or more computing devices. In some examples, the code generator 74 can be an instance of hardware, or software executing on a hardware device. In some examples, the code generator 74 and the LNG-LIF 70 can be implemented on separate nodes of a network. In other examples, the code generator 74 can be operating as an extension module on the same computing device as the computing device executing the LNG-LIF 70, operating in concert with the LNG-LIF 70.

The code generator 74 can be configured to transform the E2 interface formatted object into a concatenated text string (e.g., a mnemonic) that is formatted as a Presence Information Data Format Location Object (PIDF-LO) for the emergency services call. The PIDF-LO object can conform to standards set forth by NENA for NG9-1-1. As explained herein, the PIDF-LO object can operate as a key (e.g., primary key) that can resolve to a geographic point corresponding to (i) the cell sector site (CSS) point, (ii) latitude and longitude coordinates for a mobile VoIP phone (iii) a civic address for a fixed-base VoIP phone or (iv) the network component included in the E2 interface formatted object. The geographic point may correspond to a landmark that is in relatively close proximity to the end-user device 52 (e.g., a landmark within the CSS of the end-user device 52). Alternatively, the geographic point can correspond to a physical location of a network component (e.g., a trunk) of the carrier network.

To transform the E2 interface formatted object into a PIDF-LO, the code generator 74 examines fields of the E2 interface formatted object to identify a type of the end-user device 52. That is, the code generator 74 can determine if the end-user device 52 is a wireless phone (e.g., a cell phone), a fixed location VoIP phone or a mobile VoIP phone communicating over a Wi-Fi hotspot. Upon determining the type of the end-user device 52, the code generator 74 can select a subset of fields in the E2 interface object for the PIDF-LO 200. As an example, in situations where the end-user device 52 is a fixed location VoIP phone, the code generator 74 can select fields of the E2 interface formatted object that correspond to a street address and convert those fields into a format complying with the Civic Location Data Exchange Format (CLDXF). As another example, in situations where the end-user device 52 is a mobile VoIP phone, the code generator 74 can select fields of the E2 interface formatted object that correspond to geographic coordinates of the Wi-Fi hotpot. Still further, in situations where the end-user device 52 is a wireless phone, the code generator 74 can select fields of the E2 interface formatted object that correspond to identifiers of a carrier, a CSS (cell site sector) and Cell ID. In any of these situations, the selected fields of the E2 interface formatted object can be re-arranged and/or concatenated to provide location information that conforms to the standards for a PIDF-LO.

FIG. 4 illustrates an example of a PIDF-LO 200 that could be employed for the emergency services call corresponding to the E2 interface formatted object 100. The PIDF-LO 200 include tags that identify a name of the carrier of the end-user device 52, illustrates as "TMOB" and "T-MOBILE USA" in FIG. 4, a cell ID, illustrated as "1135" in and a CSS, illustrated as "6" in FIG. 4.

Referring back to FIG. 1, upon the generation of the PIDF-LO, the code generator 74 can execute a validation check on the location information embedded in the PIDF-LO. In some examples, due to corruption, unauthorized access (e.g., hacking) and/or stale information, the location characterized in the location information may be invalid. In some situations, the E2 interface formatted object includes data characterizing a network component (e.g., a trunk ID) that is in communication with the end-user device 52. To validate the location information, the code generator 74 can examine a table or other data structure to identify a location associated with the network component. In situations where the location information of the PIDF-LO identifies a location that is below a threshold distance from the location of the network component, the location information is presumed valid.

Conversely, in situations where the location information of the PIDF-LO identifies a location that exceeds the threshold distance from the location of the network component, the location information is presumed to be invalid. In response to determining that the location information of the PIDF-LO is declared invalid, the code generator 74 can replace the location information in the PIDF-LO with the data identifying the network component (e.g., the trunk ID) and (in some examples) data characterizing a geographic location of the network component.

The code generator 74 returns the PIDF-LO to the LNG-LIF 70. The LNG-LIF 70 examines the PIDF-LO to determine if a record including the PIDF-LO is found an ESRP table. Such a record includes an identifier (e.g., a network address) of an Emergency Services Routing Proxy (ESRP) associated with the PIDF-LO for the emergency services call is identified, namely, the selected ESRP. In such a situation, the LNG-LIF 70 transfers the call to the selected ESRP 72.

In examples where no match is found in the ESRP table, the LNG-LIF 70 can query an Emergency Call Routing Function (ECRF) 76 for an ESRP associated with the PIDF-LO. In at least one example, the ECRF 75 can be implemented as a Location-to-Service Translation (LoST) server. The ECRF 75 can be configured/programmed to lookup an ESRP for the end-user device 52 based on the PIDF-LO of the emergency services call. As noted, the PIDF-LO can resolve to a geographic point, such as a geographic point within the cell ID and CSS identified in the PIDF-LO. The geographic point corresponding the PIDF-LO can correspond to a landmark (e.g., a stadium) or to a structure (e.g., a major highway) within the CSS identified in the PIDF-LO. The ECRF 75 can identify the PSAP with jurisdiction for the geographic point corresponding to the PIDF-LO.

Each PSAP can have a set of boundaries that may be a combination of political boundaries (e.g., city boundaries) cell site boundaries, and/or ad-hoc (temporary boundaries) for a particular event. Upon identifying the boundary of the PSAP having jurisdiction of a geographic point corresponding to the PIDF-LO, the ECRF 75 can access an ESRP database 76 that identifies an ESRP for the PSAP having jurisdiction for the geographic point characterized in the PIDF-LO. The ESRP database 76 can be a relational database (e.g., a search and query language (SQL) database), a look-up table or other data structure that associates PIDF-LOs with ESRPs. Moreover, although the ESRP database 76 is illustrated as being external to the ECRF 75, it is understood that in some examples, the ESRP database 76 and the ECRF 75 can be integrated on a single system.

As one example, the PIDF-LO can identify a given cell sector (a specific geographic area) of a given cell site (based on cell identifier (ID)) or a network component (e.g., a trunk ID) that includes the end-user device 52. In such a situation, the ECRF can identify a given PSAP assigned to the given cell sector identified in the PIDF-LO. Moreover, the ECRF 75 can access the ESRP database 76 to retrieve a given ESRP associated with the given PSAP, and the given ESRP can be returned to the LNG-LIF 70. The PSAP assigned to the given cell sector could be based on a priori knowledge of emergency call routings. For instance, in situations where the given cell sector containing the end-user device 52 includes a major highway (such as an Interstate highway in the United States), a majority of emergency service calls (often 80% or more) may be ultimately be routed to a PSAP with specific jurisdiction over the major highway. In such a situation, the ECRF 75 can be programmed/configured such that the PIDF-LO identifying the given cell sector of the given cell cite is matched with the PSAP having jurisdiction over the major highway, and the ESRP associated with that particular PSAP can be returned to the LNG-LIF 70.

As another example, the PIDF-LO can include a network component (e.g., a trunk ID) that is in proximity with a given landmark (e.g., a building, a statue, a stadium, etc.). In such a situation, a given PSAP with jurisdiction to a given geographic area that encompasses the given landmark can be identified. Moreover, the ECRF 75 can access the ESRP database 76 to retrieve a given ESRP associated with the given PSAP, and the given ESRP can be returned to the LNG-LIF 70. The given PSAP assigned to the given geographic area that includes the given landmark could be based on a priori knowledge of emergency call routings. For instance, in situations where the landmark in proximity with the network component near the end-user device 52 includes a stadium, a majority of emergency service calls (often 70% or more more) may be ultimately be routed to a PSAP with jurisdiction over the stadium. In such a situation, the ESRP database 76 can be populated such that the PIDF-LO identifying the given cell sector including the given landmark is matched with the given ESRP associated with the given PSAP having jurisdiction over the landmark, and the given ESRP can be returned to the LNG-LIF 70.

The ECRF 75 and/or the ESRP database 76 can be dynamic. In some situations, a temporary event warrants additional security. For instance, police may be dispatched to a major sporting event or festival. In such a situation, the particular PSAP operators associated may be temporarily assigned to a particular ESRP for immediate communication with the already dispatched police. In this situation, the ECRF 75 and the ESRP database 76 can be updated to reflect the temporary assignment of the PSAP operators. Accordingly, in situations where the PIDF-LO includes data identifying a CSS, region or network component corresponding to the temporary event, the ECRF 75 can return the ESRP associated with the temporarily assigned PSAP operators to the LNG-LIF 70.

In response to receipt of the identified ESRP from the ECRF 75, the LNG-LIF 70 can chose the identified ESRP as the selected ESRP 72. Additionally, the LNG-LIF 70 can transfer the emergency services call with call signaling including the PIDF-LO and the locator key to the selected ESRP 72.

In some examples, the selected ESRP 72 can represent a cluster of ESRPs (which can be referred to as an ESRP cluster). In other examples, the selected ESRP 72 can represent a single ESRP. In response to receipt of the emergency services call, the selected ESRP 72 can analyze signaling of the emergency services call and/or the PIDF-LO to identify the PSAP 54 that will provide assistance for the emergency services call. Additionally, the selected ESRP 72 can transfer the emergency services call to a selection router 82 of the PSAP 54.

The selection router 82 can route the emergency services call to an appropriate instance of customer premise equipment (CPE) 84 (e.g., a PSAP operator terminal). The selection router 82 can be implemented, for example, as a private branch exchange (PBX) system. The CPE 84 can be implemented, for example, as a user terminal that implements standard PSAP software. The CPE 84 can be employed by a PSAP operator to establish bi-directional communication (e.g., voice or text) with the caller making the emergency services call.

The emergency services call routed to the CPE 84 can include an identifier that can (at least temporarily) uniquely identify the end-user device 52. Moreover, the PIDF-LO included in the call signaling of the emergency services call provides location information to the CPE 84 that can be analyzed and output to an emergency operator to facilitate dispatching of emergency services to the caller.

By employing the system 50, the emergency call initiated by the end-user device 52 can be routed to a particular PSAP 54 using the PIDF-LO format based on the E2 interface formatted object to comply with NG9-1-1 standards. In particular, in some examples, such as densely populated urban areas, each PSAP may facilitate emergency services for a relatively small geographic area. In such a situation, the majority of calls for a given CSS of a given cell ID may need to be routed to a particular PSAP, such a situation where the CSS of a given call includes a major highway. Additionally, the system 50 allows dynamic borders of PSAPs to be changed dynamically for events (e.g., sporting events and/or festivals). In this manner, the emergency services call can be routed to the PSAP 54 with the highest probability of being the appropriate PSAP 54 to dispatch emergency services to the user of the end-user device 52. Further still, the PIDF-LO is a self-contained data object with location information for the end-user device 52 embedded therein. Accordingly, there is no requirement for the CPE 84 (or other node of the PSAP 54) to query a third party database, such as an Automatic Location Information (ALI) database for location information regarding the emergency services call. However, it is understood that nothing in the system 50 prevents such a query to a third party database.

Figure 5:
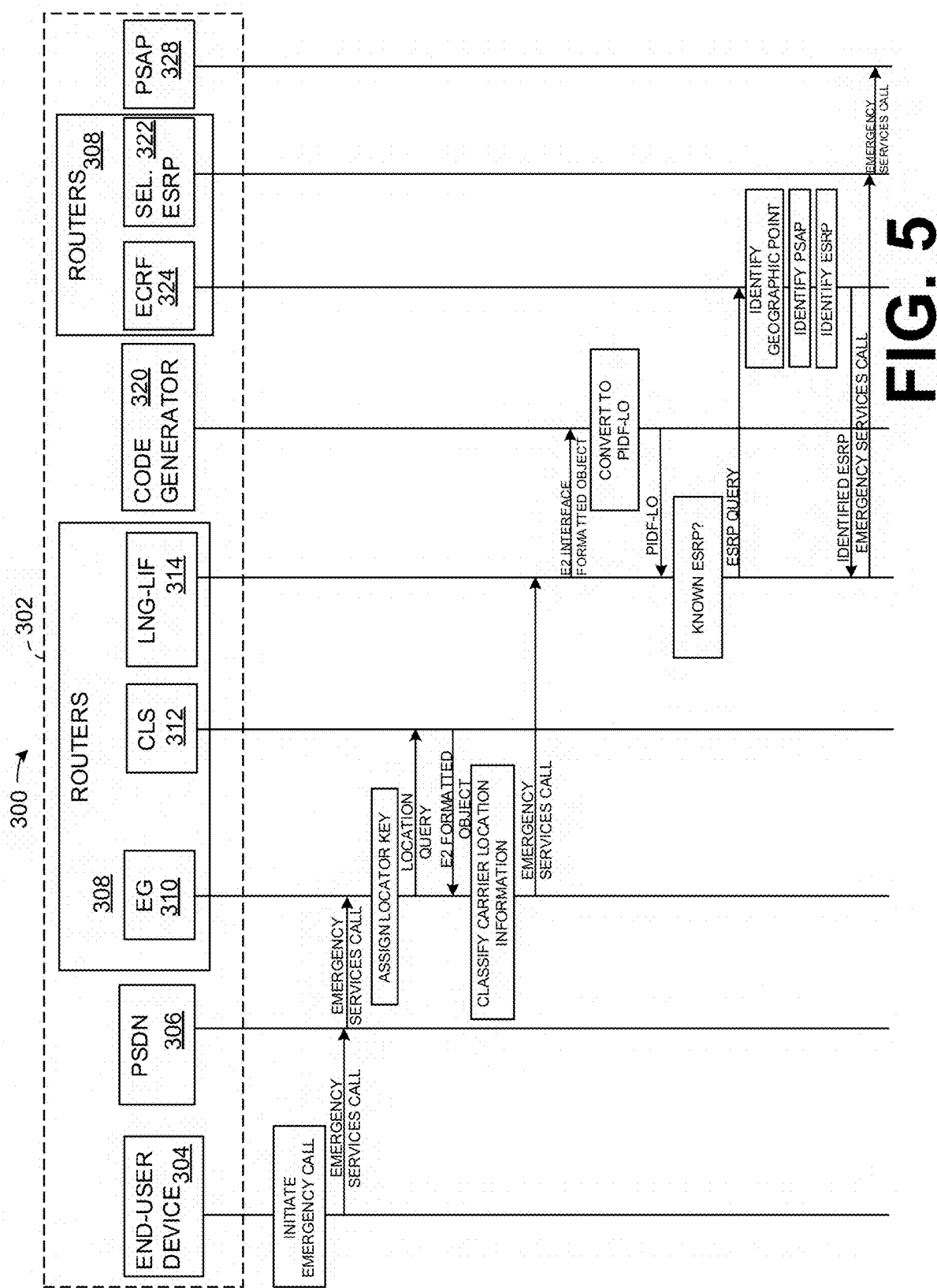
FIG. 5 illustrates an example of a timing diagram of a system configured to process an emergency services call.

FIG. 5 illustrates a timing diagram 300 for a system 302 to process an emergency services call (e.g., a system implementing a method). The system 302 can include nodes that communicate over a public network, such as the Internet, a private network, such as a wireless carrier network or a combination thereof. The system 302 can include an end-user device 304. The end-user device 304 can be implemented, for example, as a VoIP phone (mobile or fixed-based), a wireless phone (e.g., a smart phone or feature phone operating on a carrier network), etc. The end-user device 304 can be employed to implement the end-user device 52 illustrated in FIG. 1.

The end-user device 304 can be employed to initiate an emergency services call (e.g., a 9-1-1 voice or text call in North America). A user of the end-user device 304 can be referred to as a caller (of the emergency services call). The end-user device 304 can be connected with a PSDN 306 (primary service delivery node), which can be implemented as an MSC on a wireless subscriber network that communicates with the end-user device 304 or a VSP that communicates with the end-user device 304 on a TCP/IP network. The PSDN 306 can detect that the call is an emergency services call (e.g., by detecting that the call is directed to an emergency services contact center if the call has "9-1-1" digits). The PSDN 306 can process the emergency services call and route/forward the emergency services call to call routers 308 (labeled in FIG. 5 as "ROUTERS"), which are split into two boxes for purposes of simplification of explanation. The call routers 308 can be representative of telephony network components and/or Internet network components needed to route or provide routing information to connect the emergency services call to an appropriate call handling facility (e.g., a PSAP).

The emergency services call can be, for example, a voice 9-1-1 call, a 9-1-1 text (or short) message (e.g., a short message service (SMS) message or a multimedia service (MMS) message), etc.

The call routers 308 can include an emergency gateway 310 (labeled in FIG. 6 as "EG") that can receive the emergency services call. In response to the notification of the emergency services call, the emergency gateway 310 can assign a locator key (e.g., an ESxK) to the emergency services call. Additionally, the emergency gateway 310 can provide a location query to a carrier location server 312 (labeled in FIG. 6 as "CLS"). The carrier location server 312 can be employed to implement the carrier location server 64 illustrated in FIG. 1. The carrier location server 312 can return carrier location information (e.g., geographic coordinates, a cell sector/area and/or a civic address) of the end-user device 304 to the emergency gateway 310. The carrier location information can include a location and a precision. The precision characterizes an error radius of the location. Additionally, in some examples, the carrier location information can include a timestamp. In the present examples, the carrier location information is presumed to be an E2 interface formatted object (labeled as "E2 INTERFACE FORMATTED OBJECT" in FIG. 5), such as the E2 interface formatted object 100 of FIG. 2.

In response to receipt the E2 interface formatted object (carrier location information), the emergency gateway 310 can classify the E2 interface formatted object to determine how the emergency services call is to be routed. In situations where the E2 interface formatted object is classified as precise location information (e.g., geographical coordinates from GNSS processing) for the end-user device 304, the emergency gateway 310 can process the emergency services call directly (not shown). In other situations, the E2 interface formatted object can be classified as being coarse (e.g., less precise) location information. For example, the E2 interface formatted object can be classified as coarse information in situations where the carrier location information includes a CSS and cell ID (for a wireless caller), a street address (e.g., for a mobile or fixed-base VoIP caller) or a network component (e.g., a trunk ID). For purposes of simplification of explanation, in further examples described, it is presumed that the carrier location information is classified as coarse location information.

Upon classifying the E2 interface formatted object (carrier location information), as coarse location information, the emergency gateway 310 can forward the emergency services call along with call signaling including the locator key and the E2 interface formatted object to an LNG-LIF 314. The LNG-LIF 314 can be employed to implement the LNG-LIF 70 of FIG. 1. The LNG-LIF 314 can push the E2 interface formatted object to a code generator 320. The code generator 320 can be implemented as an extension of the LNG-LIF 314 (e.g., an LNG-LIF extension) and/or an ECRF enabler. The code generator 320 can be employed to convert the E2 interface formatted object into a PIDF-LO. The PIDF-LO can be implemented in a manner similar to the PIDF-LO 200 illustrated in FIG. 4. In particular, in situations where the end-user device 304 is a wireless phone, the PIDF-LO includes a carrier name (and/or other carrier ID), a cell ID and a CSS (Cell Site Sector). Accordingly, the PIDF-LO can conform to NG9-1-1 standards.

The code generator 320 can send the PIDF-LO to the LNG-LIF 314. In response, the LNG-LIF 314 can examine the PIDF-LO to determine if the ESRP for the PIDF-LO is known. If the ESRP is known, the known ESRP is chosen as the selected ESRP 322 (labeled in FIG. 5 as "SEL. ESRP"). If the ESRP is unknown to the LNG-LIF 314, the LNG-LIF 314 queries an ECRF 324 for the ESRP associated with the emergency services call. The query can include the PIFD-LO and the locator key associated with the emergency services call.

In response to the query, the ECRF 324 can identify a geographic point corresponding to the PIDF-LO. As an example, the ECRF 324 can determine a landmark or other structure that is in proximity to the region or geographic location identified by the PIDF-LO. As an example, if the PIDF-LO identifies a given CSS and cell ID, the geographic point can correspond to a landmark within the given CSS. The ECRF 324 can identify a PSAP 328 with jurisdiction over the geographic point at the time of the emergency services call. It is understood that the borders of the jurisdiction of each PSAP can change dynamically. The ECRF 324 can examine an ESRP database (e.g., the ESRP database 76) or other data structure to identify an ESRP corresponding to the PSAP with jurisdiction over the geographic point. The ECRF 324 can return the identified ESRP to the LNG-LIF 314. The LNG-LIF 314 can chose the identified ESRP as the selected ESRP 322.

The LNG-LIF 314 can transfer the emergency services call, along with the locator key and the PIFD-LO to the selected ESRP 322 as call signaling. The selected ESRP 322 can examine the call signaling, and transfer the emergency services call to the appropriate PSAP 328, which PSAP 328 has jurisdiction over the geographic point corresponding to the PIFD-LO. In this manner, legacy information (the E2 interface formatted object) can be leveraged to generate the PIDF-LO to conform to NG9-1-1 standards.

Figure 6:
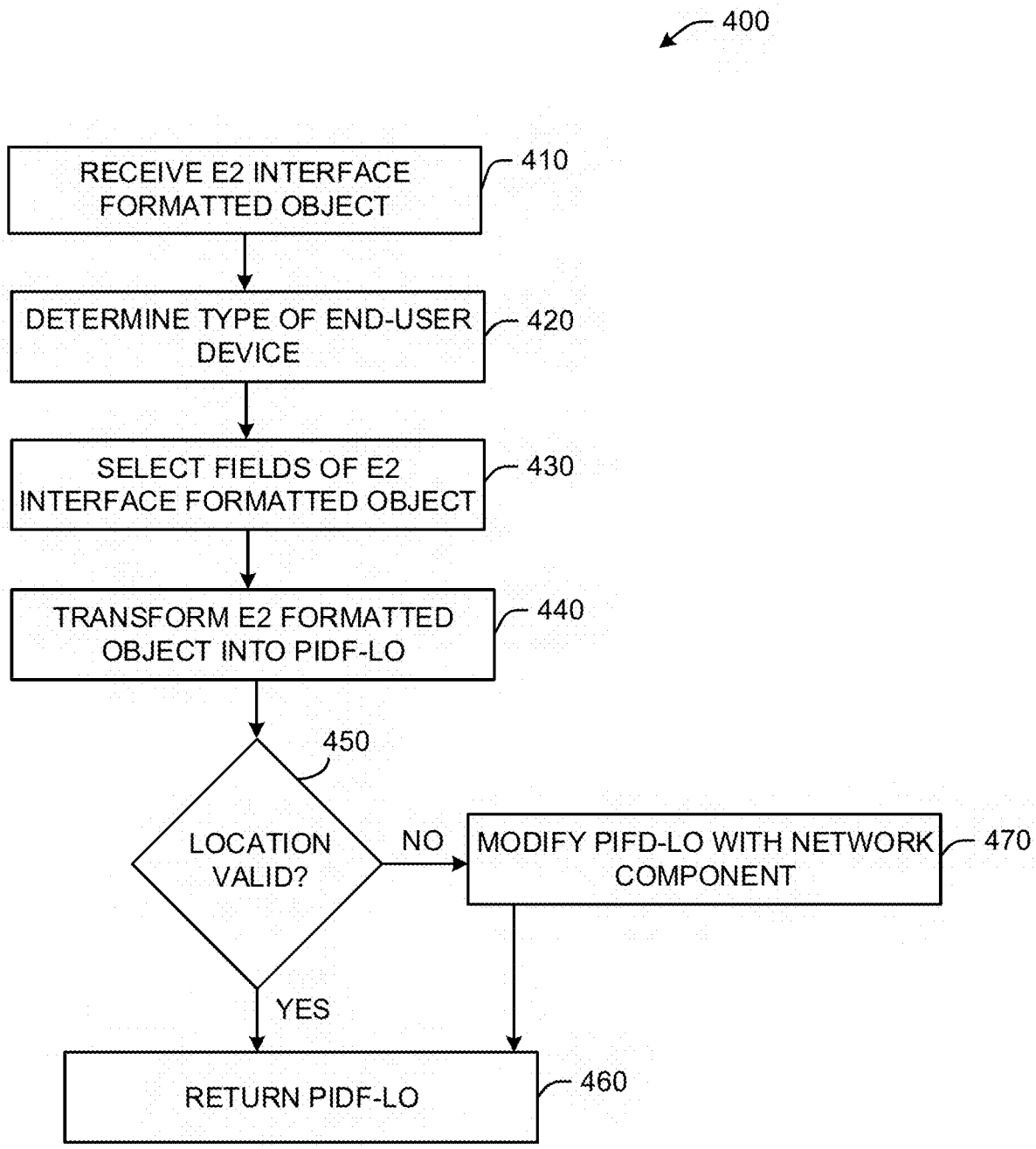
FIG. 6 illustrates a flowchart of an example method for converting an E2 interface formatted object into a PIDF-LO.

In view of the foregoing structural and functional features described above, example methods will be better appreciated with reference to FIG. 6. While, for purposes of simplicity of explanation, the example method of FIG. 6 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 6 can be implemented as instructions stored in a non-transitory machine-readable medium. The instructions can be accessed by a processing resource (e.g., one or more processor cores) and executed to perform the methods disclosed herein.

FIG. 6 illustrates a flowchart of an example method 400 for transforming an E2 interface formatted object for an emergency services call into a PIDF-LO. The method 400 can be implemented, for example, by the code generator 74 of FIG. 1 and/or the code generator 320 of FIG. 5. At 410, the code generator receives the E2 interface formatted object from an LNG-LIF (e.g., the LNG-LIF 70 of FIG. 1). At 420, the code generator can identify a type device of employed to make the emergency services call. In some examples, the emergency services call can be made from a wireless phone. In other examples, the emergency services call can be made from a fixed-base mobile phone or a mobile (e.g., Wi-Fi) VoIP phone.

At 430, the code generator can select fields for the PIDF-LO based on the type of end-user device determined at 420. For example, if the end-user device is a wireless device (e.g., a smartphone), the location information for the PIDF-LO can be a CSS (cellular site sector) for a specific cell site. In this situation, the code generator can select fields in the E2 interface formatted data object related to the CSS and Cell ID and a carrier ID. In other examples, if the end-user device is a VoIP phone, the location information for the PIDF-LO can be latitude and longitude coordinates for a Wi-Fi hotspot in communication with the end-user device. In this situation, the code generator selects fields in the E2 interface formatted object related to the latitude and longitude coordinates, along with fields indicating that the end-user device is a VoIP phone.

At 440, the code generator can transform the E2 interface formatted object into a PIDF-LO, such as the PIDF-LO 200 of FIG. 4. The particular format of the PIDF-LO can be based on fields selected in 430. At 450, the code generator can examine the location information in the PIDF-LO to determine if the location information is valid. As one example, if the E2 interface formatted object indicates that the end-user device is communicating via a given network component (e.g., trunk), but the CSS identified in the PIDF-LO is too far from the given network component to be valid (indicating that the CSS may have been corrupted or spoofed), the location information in the PIDF-LO may be declared invalid by the code generator. Similarly, in situation where the end-user device is a mobile VoIP phone and the location of the hotspot associated with the VoIP phone indicates a high degree of likelihood (e.g., greater than 50%) to be invalid, the code generator may determine that the location information is invalid. If the determination at 450 is positive (e.g., YES, indicating that the location information of the PIDF-LO is valid), the method 400 can proceed to 460. If the determination at 450 is negative (e.g., NO, indicating that the location information of the PIDF-LO is invalid), the method 400 can proceed to 470.

At 470, the PIDF-LO is modified to include the network component (e.g., the trunk ID) as the location information for the PIDF-LO, and the method 400 proceeds to 460. At 460, the PIDF-LO, which is consumable by an ECRF (complying with NG9-1-1 standards) is returned to the LNG-LIF, where the LNG-LIF can process the emergency services call in the manner described herein.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

The invention claimed is:

1. A code generator comprising one or more computing devices that:
receives a data object from a legacy network gateway location interwork function (LNG-LIF) for an emergency services call initiated by an end-user device, wherein the data object comprises location information in a legacy format;
selects fields of the location information for the emergency services call;
converts the data object in the legacy format into a presence information data format location object (PIDF-LO) based on the selected fields of the location information in the data object for the emergency services call, wherein the PIDF-LO embeds location information for the end-user device; and
sends the PIDF-LO to the LNG-LIF, wherein the PIDF-LO is a format consumable by an Emergency Call Routing Function (ECRF).

2. The code generator of claim 1, where the data object is in the E2 interface format.

3. The code generator of claim 2, wherein the location information of the PIDF-LO includes a cell site sector and a cell site identifier (ID) for the end-user device.

4. The code generator of claim 2, wherein the location information of the PIDF-LO includes latitude and longitude coordinates for a Wi-Fi hotspot communicating with the end-user device.

5. The code generator of claim 2, wherein the location information of the PIDF-LO includes a civic address assigned to the end-user device.

6. The code generator of claim 2, wherein the code generator validates the location information for the end-user device.

7. The code generator of claim 6, wherein the code generator replaces location information of the PIDF-LO with data identifying a network component that communicates with the end-user device in response to determining that the location information of the PIDF-LO is invalid.

8. A system comprising:
a legacy network gateway location interwork function (LNG-LIF) that:
receives an emergency services call from an emergency gateway, the emergency services call comprising an E2 interface formatted object that includes a locator key for an end-user device that initiated the emergency services call and location information for the end-user device;
a code generator that:
receives the E2 interface formatted object from the LNG-LIF;
selects fields in the E2 interface formatted object;
generates a presence information data format location object (PIDF-LO) based on the selected fields of the E2 interface formatted object, wherein the PIDF-LO characterizes a geographic location associated with the end-user device; and
provides the PIDF-LO to the LNG-LIF;
wherein the LNG-LIF selects an Emergency Services Routing Proxy (ESRP) for the emergency services call; and
transfers the emergency services call comprising the PIDF-LO to the selected ESRP, wherein the selected ESRP transfers the emergency services call to a given Public Safety Answering Point (PSAP) with jurisdiction over the geographic location characterized by the PIDF-LO.

9. The system of claim 8, wherein the selecting by the LNG-LIF comprises:
querying an Emergency Call Routing Function (ECRF) for an ESRP; and
receiving data identifying the selected ESRP from the ECRF.

10. The system of claim 9, wherein the ECRF:
identifies geographic coordinates characterized in the PIDF-LO in response to the query;
identifies the given PSAP with jurisdiction over the geographic point; and
identifies the selected ESRP, wherein the selected ESRP is associated with the given PSAP.

11. The system of claim 10, wherein the identity of the given PSAP changes over time.

12. The system of claim 10, wherein the geographic coordinates corresponds to a landmark.

13. The system of claim 10, wherein the geographic coordinates corresponds to a highway, wherein the given PSAP has jurisdiction over the highway.

14. The system of claim 9, wherein the query to the ECRF includes the locator key for an end-user device that initiated the emergency services call.

15. The system of claim 8, wherein the geographic location of the PIDF-LO is characterized by a cell site sector and a cell site identifier (ID) for the end-user device embedded in the PIDF-LO.

16. The system of claim 8, wherein the geographic location of the PIDF-LO includes latitude and longitude coordinates for a Wi-Fi hotspot communicating with the end-user device embedded in the PIDF-LO.

17. The system of claim 8, wherein the geographic location of the PIDF-LO includes a civic address assigned to the end-user device embedded in the PIDF-LO.

18. The system of claim 8, wherein the code generator validates the geographic location of the PIDF-LO and the code generator replaces the geographic location of the PIDF-LO with data identifying a network component that communicates with the end-user device in response to determining that the location information of the PIDF-LO is invalid.

19. A method comprising:
receiving an E2 interface formatted object from a legacy network gateway location interwork function (LNG-LIF) for an emergency services call initiated by an end-user device, wherein the E2 interface formatted object comprises location information for the end-user device;
determining a type for the end-user device;
selecting fields of the location information in the legacy format for the emergency services call based on the type of the end-user device;
transforming the E2 interface formatted object into a presence information data format location object (PIDF-LO), wherein the PIDF-LO embeds location information for the end-user device; and
sending the PIDF-LO to the LNG-LIF, wherein the PIDF-LO is a format consumable by an Emergency Call Routing Function (ECRF).

20. The method of claim 19, further comprising:
determining whether the location information of the PIDF-LO is valid; and
replacing the geographic region of the PIDF-LO with data identifying a network component that communicates with the end-user device in response to determining that the location information of the PIDF-LO is invalid.

* * * * *